US010898798B2

(12) United States Patent
Chapman et al.

(10) Patent No.: US 10,898,798 B2
(45) Date of Patent: Jan. 26, 2021

(54) DIRECTED WIND EFFECT FOR AR/VR EXPERIENCE

(71) Applicant: Disney Enterprises, Inc., Burbank, CA (US)

(72) Inventors: Steven M. Chapman, Burbank, CA (US); Javier Soto, Burbank, CA (US); Mehul Patel, Burbank, CA (US); Joseph Popp, Burbank, CA (US); Calis Agyemang, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 211 days.

(21) Appl. No.: 15/854,714

(22) Filed: Dec. 26, 2017

(65) Prior Publication Data

US 2019/0192965 A1   Jun. 27, 2019

(51) Int. Cl.
| | |
|---|---|
| *A63F 9/24* | (2006.01) |
| *A63F 13/00* | (2014.01) |
| *G06F 17/00* | (2019.01) |
| *A63F 13/28* | (2014.01) |
| *A63F 13/50* | (2014.01) |

(52) U.S. Cl.
CPC ............. *A63F 13/28* (2014.09); *A63F 13/50* (2014.09); *A63F 2300/8082* (2013.01)

(58) Field of Classification Search
CPC ................... A63F 2300/80802; A63F 13/21
See application file for complete search history.

(56) References Cited

U.S. PATENT DOCUMENTS

| | | | |
|---|---|---|---|
| 2008/0153591 A1* | 6/2008 | Deligiannidis | G06F 3/011 463/31 |
| 2009/0156307 A1* | 6/2009 | Aguirre | A63F 13/02 463/38 |
| 2013/0038599 A1* | 2/2013 | Krakowski | G06T 11/00 345/419 |
| 2014/0272915 A1* | 9/2014 | Higashino | B06B 1/16 434/365 |
| 2017/0178469 A1* | 6/2017 | Nahman | G08B 6/00 |
| 2017/0266676 A1* | 9/2017 | Fateh | B05B 7/2497 |

* cited by examiner

*Primary Examiner* — Kang Hu
*Assistant Examiner* — Jason Pinheiro
(74) *Attorney, Agent, or Firm* — Dorsey & Whitney LLP

(57) ABSTRACT

An air flow generator may be implemented on an augmented reality (AR) or virtual reality (VR) controller or head-mounted display (HMD) through which an AR or VR experience is presented. Based on content upon which the AR or VR experience is based, air flow effects can be provided by the air flow generator. In particular, desired air flow effect parameters based on or obtained from the content, can be used to enhance the AR or VR experience through generating air flow directed at a user of the HMD. The air flow generated by the air flow generator can be further enhanced by the addition of liquid and/or scented additives.

20 Claims, 6 Drawing Sheets

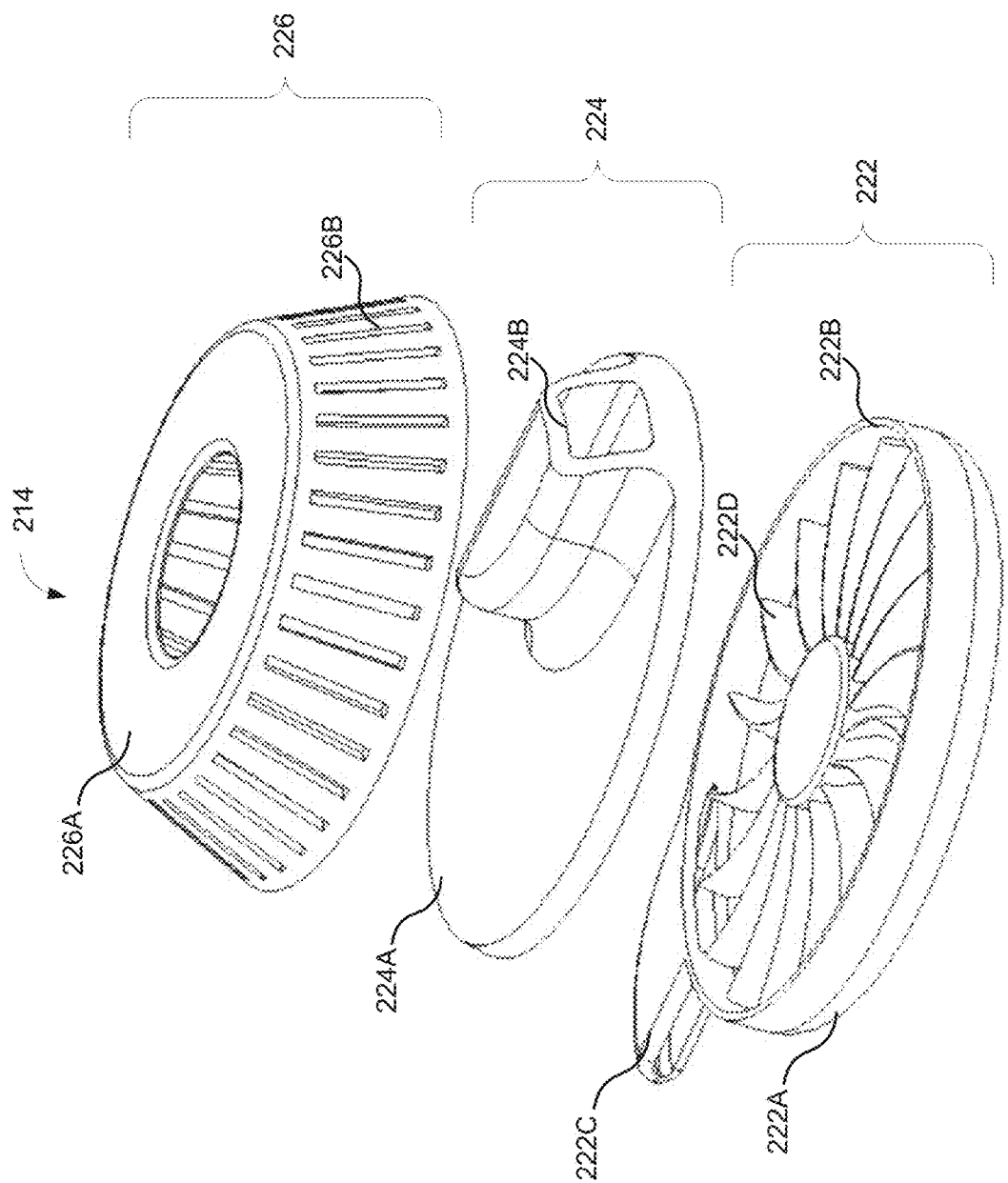

DIRECTED WIND EFFECT FOR AR/VR EXPERIENCE

TECHNICAL FIELD

The present disclosure relates generally to augmented and/or virtual reality presentations or experiences.

DESCRIPTION OF THE RELATED ART

Virtual reality (VR) can refer to the creation of a fully immersive virtual world/space experience that users may interact with. For example, computer-generated graphics may be used to create a simulated world or experience with which a user can interact. Augmented reality (AR) can refer to the blending of VR elements and real life. For example, AR may involve providing a live displayed experience of a physical, real-world environment in which the real-world elements are augmented by computer-generated sensory input. Oftentimes, AR/VR worlds or environments may be experienced using head-mounted displays (HMDs).

BRIEF SUMMARY OF THE DISCLOSURE

In accordance with one embodiment, a method may comprise determining desired air flow effect parameters, and determining at least one of position and orientation of a head-mounted display (HMD) presenting an augmented reality (AR) or virtual reality (VR) experience to a user. The method may further comprise determining at least one of position and orientation of an air flow generator relative to the HMD. The air flow generator can be actuated to aim the air flow generator in accordance with the desired air flow effect parameters and the at least one of the position and orientation relative to the HMD. Additionally, a desired air flow effect on the user of the HMD is generated.

In some embodiments, determining the desired air flow effect parameters comprises parsing software code that upon execution generates the AR or VR experience.

In some embodiments, determining the desired air flow effect parameters comprises receiving the desired air flow effect parameters from the HMD at a controller of the air flow generator.

In some embodiments, the desired air flow effect parameters comprises at least one of an air flow intensity value, a duration during which air flow should be generated, and at least one direction in which the air flow should be directed relative to the user.

In some embodiments, the determination of at least one of the position and orientation of the air flow generator relative to the HMD repeats throughout presentation of the AR or VR experience to the user.

The method may further comprise regulating at least one of air intake and air flow output from the air flow generator in accordance with the desired air flow effect parameters and the at least one of the position and orientation relative to the HMD.

Actuating the air flow generator may comprise controlling a tilting element of the air flow generator to direct the air flow. Actuating the air flow generator may comprise controlling a rotating element of the air flow generator to direct the air flow.

In some embodiments, the air flow can be enhanced with at least one of a scented and liquid additive. Determining the at least one of the position and orientation of the air flow generator relative to the HMD can comprise determining at least one of a position and orientation of an AR or VR controller controlling the user's interaction with the AR or VR experience upon which the air flow generator is implemented.

In some embodiments, a system comprises a non-transitory computer-readable medium having instructions stored thereon. When executed by a processor, the instructions cause the system to determine desired air flow effect parameters that enhance an augmented reality (AR) or virtual reality (VR) experience with which a user is engaged via a head-mounted display (HMD). The instructions can also cause the system to determine at least one of a position and orientation of an air flow generator relative to the HMD. Further still, the instructions may cause the system to generate a desired air flow effect on the user of the HMD in accordance with the desired air flow effect parameters and the at least one of the position and orientation of the air flow generator relative to the HMD.

In some embodiments, the system further comprises an AR or VR controller communicatively connected to the HMD and upon which the air flow generator is implemented. In some embodiments, the processor comprises a processing component of the AR or VR controller. In some embodiments, the AR or VR controller moves relative to the HMD in accordance with one or more user actions.

In some embodiments, the system further comprises one or more sensors and one or more markers associated with at least one of the HMD, the air flow generator, and the AR or VR controller. The one or more sensors track the one or more markers to allow the determination of the at least one of the position and orientation of the air flow generator relative to the HMD.

In some embodiments, the desired air flow effect parameters comprises at least one of an air flow intensity value, a duration during which air flow should be generated, and at least one direction in which the air flow should be directed relative to the user. In some embodiments, the air flow generator comprises a fan assembly, an air pointer, and a static air outlet.

The instructions that when executed by the processor cause the system to generate the desired air flow effect on the user of the HMD comprise instructions to control at least one of an air taken in by the fan assembly, and a speed at which the fan assembly operates to control an intensity of the air flow output from the air pointer. The instructions that when executed by the processor cause the system to generate the desired air flow effect on the user of the HMD comprise instructions to actuate the air pointer in one or more directions to control a direction in which the air flow is output from the air pointer.

In some embodiments, the processor comprises a processing component of the HMD.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 2B is an exploded view of an example air flow generator configured in accordance with one embodiment of the present disclosure.

The figures are not exhaustive and do not limit the disclosure to the precise form disclosed.

DETAILED DESCRIPTION

AR and VR technologies may be used to provide an immersive experience to users for entertainment, educational, or other purpose. Typically, AR and VR technologies focus on the visual aspects of the experience, e.g., through the use of hyper-real computer-generated graphics and "three-dimensional sound." However, real-world experiences are not limited to just visual/auditory aspects. They may also involve aspects that impact other user senses, such as feel and smell.

Accordingly, various embodiments of the present disclosure are directed to providing sensory enhancements in addition to the visual/auditory aspects of an AR or VR experience. For example, many AR and VR experiences may be enhanced through the use of a wind effect as a result of an AR or VR element, such as car or laser blast, passing by a user. In an outdoor or otherwise windy AR or VR experience, the wind itself may be simulated. The same holds true for smells or scents as well as rain or mist that a user may expect to experience while interacting with an AR or VR environment. To achieve this functionality, one or more air flow generators may be implemented on an AR or VR controller and/or an HMD. Air flow can be generated by the one or more air flow generators and directed to an appropriate area of a user's face, body, etc. The direction of air flow may be ascertained by determining the positioning and/or orientation of an HMD and the one or more air flow generators relative to each other, as well as the air flow parameters dictated by the AR or VR experience. Moreover, scents or mist can be directed towards a user as well by, e.g., impregnating the air with appropriate odors vis-à-vis perfumes, essential oils, olfactory agents, water droplets, vapor, etc.

Figure 1:
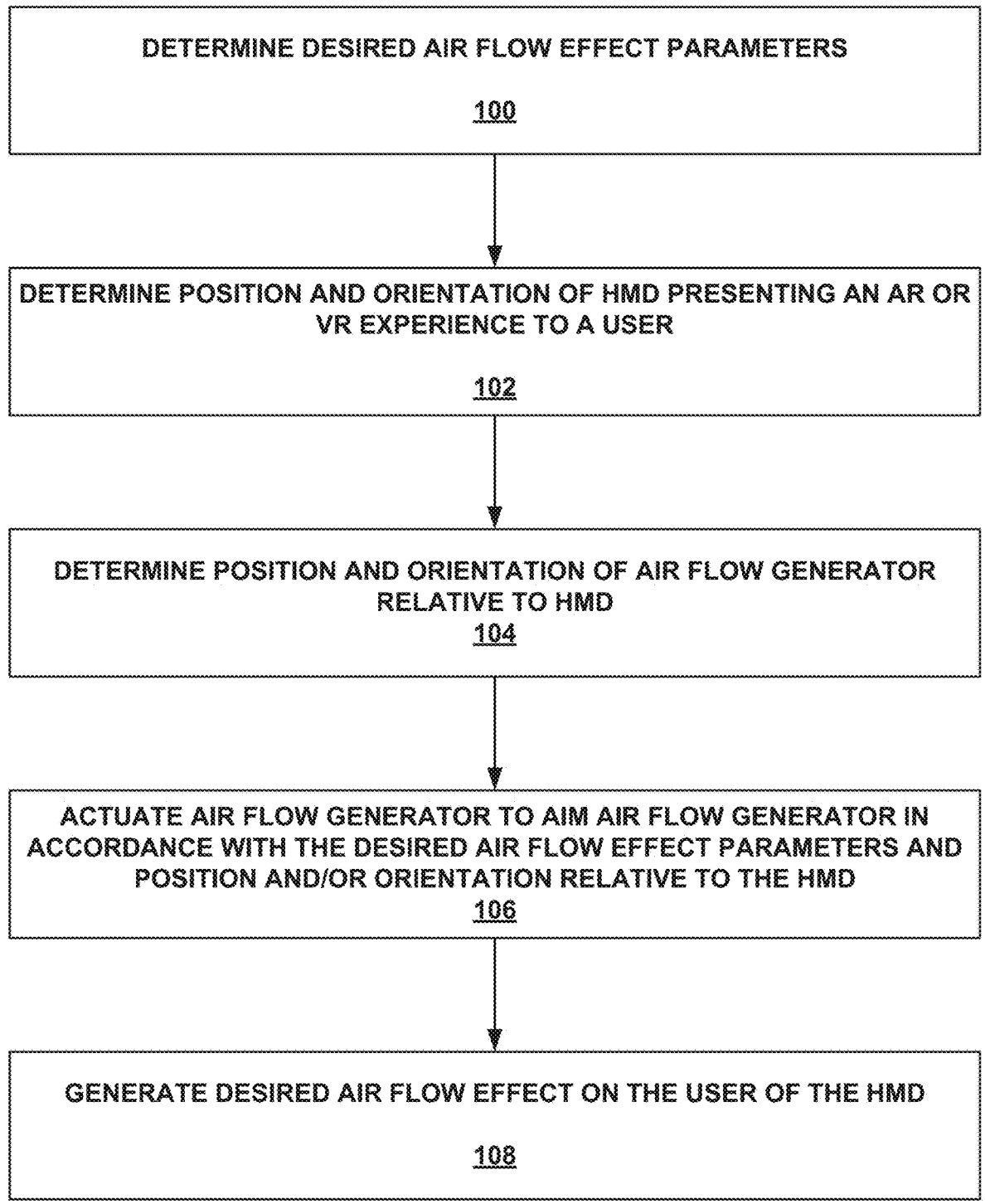
FIG. 1 is an operational flow chart diagram illustrating an example method that may be implemented for directing air flow to simulate a wind effect in accordance with the present disclosure.

FIG. 1 is an operational flow chart illustrating example operations that can be performed to provide directed air flow effects in an AR or VR experience. FIG. 1 is described in conjunction with FIG. 2A, which is a block diagram illustrating an example architecture or components of an HMD and an air flow generator that may be implemented to achieve directed air flow.

At operation 100, desired air flow effect parameters may be determined. The desired air flow effect may include, for example, a desired intensity and length of the air flow effect, a desired frequency of occurrence of the air flow effect, a desired shape of the air flow effect, etc. The desired air flow effect may be based on the AR or VR content that is being presented to the user. For example, the desired air flow effect may be triggered at a particular time during presentation of the AR or VR content (e.g., a video time code). For example, the desired air flow effect may be triggered by an action taken by the user, e.g., an action taken by the user during an AR or VR experience, and/or by some action associated with an AR or VR element of the AR or VR experience. For example, the desired air flow effect may be triggered by a contextual scenario or element of the AR or VR experience, such as an outdoor scene, a flying scene, etc. In another example, an air flow effect may be generated based on the user's current position or movement. For example, a desired air flow effect may include air movement effects of virtual objects (flying bullets, a swinging sword, explosion, moving animals, wind, rain, sports ball, door opening/closing, vehicle, etc.) around or proximate to the user.

Figure 2A:
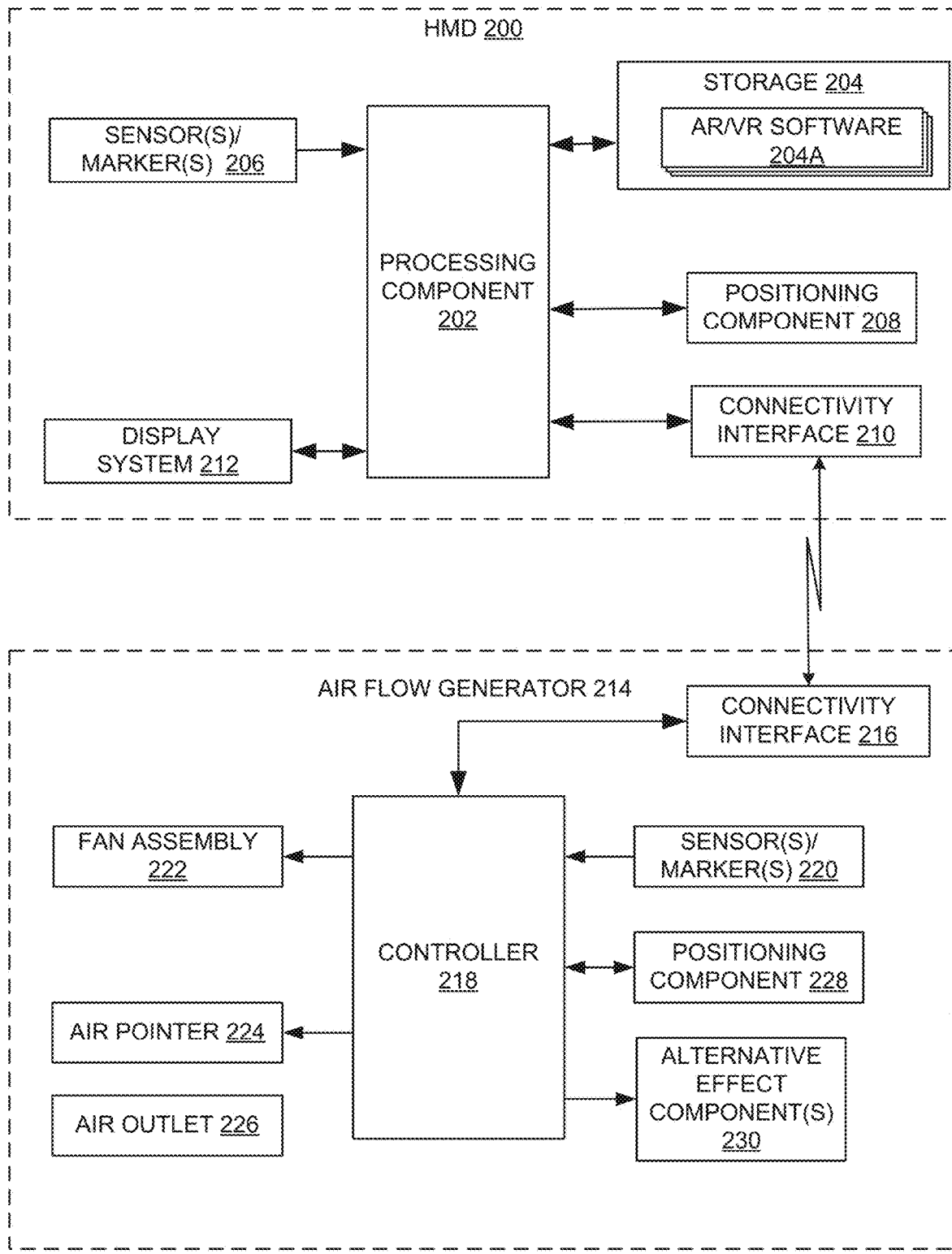
FIG. 2A is a block diagram illustrating an example architecture for components of an HMD and an air flow generator that may be implemented to achieve directed air flow in accordance with the present disclosure.

These aspects of the desired air flow may be characterized by air flow effect parameters, e.g., time duration values indicative of the desired length a user should experience the air flow effect, force values indicative of the desired intensity of the air flow effect, etc. Referring to FIG. 2A, the desired air flow effect parameters may be included, e.g., coded, as part of the AR or VR experience through AR or VR software 204A. That is, HMD 200 may present an AR or VR experience to the user (e.g., a video, a video game, an educational AR or VR application, etc.). HMD 200, in various embodiments, may be any head-mounted system (e.g., a visor, glasses, goggles, head-mounted smartphone, etc.) that may display AR and/or VR content. For example, HMD 200 may display a VR view of a computer-generated environment or an augmented view of a real-world environment. HMD 200 may comprise a processing component 202, a storage component 204 (in which the aforementioned AR or VR software 204A may be stored), one or more sensors and/or markers 206, a positioning component 208, a connectivity interface 210, and a display system 212. In some embodiments, HMD 200 may include an AR display such as an optical see-through or video see-through display that supplements video of the user's real world environment with overlaid digital objects. For example, the AR display may include a transparent OLED or LED screen that uses a waveguide or light guide to display digital objects overlaid over the real-world environment.

Storage 204 may comprise volatile memory (e.g. RAM), non-volatile memory (e.g. flash storage), or some combination thereof. In various embodiments, storage 204 stores an AR or VR software application 204A, that when executed by processing component 202 (e.g., a digital signal processor), generates an AR or VR view or presentation on a display of display system 212 representative of an AR or VR environment. Display system 210 may include a VR video display that is not see-through or a display that is partially see-through.

AR or VR software 204A may be coded with one or more desired air flow parameters as previously discussed. Accordingly, when executing AR or VR software 204A, processing component 202 may become aware of a need to generate air flow in a certain direction, with a certain intensity, for a certain duration of time, etc. For example, AR or VR software may include code for generating a virtual spaceship that is to appear before the user in a VR gaming experience. The code reflects that when the virtual spaceship flies by the user, e.g., to the left, right over, etc., an appropriate air flow effect should be activated to provide a sensation of wind blowing by the user. The code may also reflect that when the virtual spaceship shoots a laser at the user, an appropriate air flow effect representative of the felt force of the laser beam passing by the user should be activated. It should be noted that in some implementations, desired airflow effects may be generated independently of the AR or VR content that is being presented to the user. As will be discussed below, processing component 202, through connectivity interface 210, may communicate with air flow generator 214 to achieve the desired air flow effect based on the desired air flow effect parameters.

For example, the desired air flow effect parameters may be communicated to controller 218 of air flow generator 214 via connectivity interface 216. The respective connectivity interfaces 210 and 216 of HMD 200 and air flow generator 214 may connect to each other through one or more communication media. Examples of communication media may include, but is not limited to a wireless network system such as a BLUETOOTH system, a ZIGBEE system, an Infrared (IR) system, a Radio Frequency (RF) system, a wireless local area network, or the like. In some embodiments, controller 218 may receive one or more portions or the entirety of AR/VR software 204A and parse the AR/VR software 204A to extract relevant air flow effect parameters. Controller 218 may then, based on the relevant air effect parameters, e.g., time of activation, duration of air flow effect, etc., activate air flow through air flow generator 214.

Returning to FIG. 1, the position and/or orientation of an HMD presenting the AR or VR experience to the user is determined at operation 102. Additionally, at operation 104, the position and/or orientation of an air flow generator relative to the HMD is determined. The position of the HMD (representative of the location of the user's head/face) and the position of the air flow generator are determined and may serve as reference points so that air flow can be directed from the air flow generator to the appropriate location at or near the HMD/user. In some embodiments, depending on the AR or VR experience or context, the orientation of the HMD and/or the air flow generator may also be determined in order to correctly direct the desired air flow. For example, if a user wearing the HMD is looking up, a VR element passing overhead may be associated with a stronger air flow effect as the top of the user's head may be closer to the passing VR element.

Referring to FIG. 2A, positioning component 208 of HMD 200 may comprise one or more devices for retrieving positional information over a network. For example, positioning component 208 may include a global positioning system receiver, a cellular receiver, a network interface card, an altimeter, or some combination thereof. The positional information retrieved by positioning component 208 may be processed by processing component 202 to determine the geographical coordinates of HMD 200. For example, application software installed in storage 202 may use the location of HMD 200 from a GPS reading along with a map of declination (e.g., stored or retrieved from a network) to determine the geographical coordinates of HMD 200.

In some embodiments, the granularity of a GPS or other location-based reading may not be precise enough to be used as a basis for determining where a desired air flow effect should be directed. Accordingly, in some embodiments, HMD 200 and air flow generator 214 may comprise one or more sensors and/or markers so that their positioning and/or orientation relative to each other may be determined. For example, one or more sensors 220 of air flow generator 214 (which may comprise a camera or receiver or other sensor) may sense one or more markers 206 associated with HMD 200. The one or more markers 206 may be beacons, visual markers, etc. that can be sensed by the one or more sensors 220. In this way, one or more of the angle, distance, and/or other relevant positioning parameters can be determined.

In some embodiments, the one or more sensors/markers 206 and the one or more sensors/markers 220 may be used by the controller 218 to automatically maintain a constant reference position and/or orientation of air flow generator 214 relative to HMD 200. In this embodiment, air flow generator 214 may be mounted at least in part on a gyroscope or with some weighted engagement mechanism. In this way, only the desired air flow effect parameters are needed in order to generate the desired air flow effect.

For example, air flow generator 214 may be implemented on an AR or VR controller used to control aspects of an AR or VR experience presented by display system 212 of HMD 200. In this case, the distance from the AR or VR controller to the HMD 200 as well as the angle at which the AR or VR controller is being held relative to HMD 200 can be determined. An appropriate intensity of air flow (based on the distance) and an appropriate direction of air flow (based on the angle) can be effectuated. It should be understood that one or more components of air flow generator 214 may be implemented on another device, such as the aforementioned AR or VR controller. For example, controller 218, connectivity interface 216, the one or more sensor(s)/marker(s) 220, positioning component 228, and/or alternative effect component 230 may be configured as part of the AR or VR controller instead of in conjunction with fan assembly 222, air pointer 224, and air outlet 226. In an embodiment where air flow generator 214 is implemented on or as part of HMD 200, controller 218, connectivity interface 216, the one or more sensor(s)/marker(s) 220, positioning component 228, and/or alternative effect component 230 may be configured as part of HMD 200. Controller 218 may be a separate controller from processing component 202. In some embodiments, controller 218 may embodied as (or the functionality thereof implemented in) processing component 202.

In some embodiments, HMD 200 may rely on its one or more sensors 206 to sense the position and/or orientation of air flow generator 214 via the one or more markers 220 of air flow generator 214. This position and/or orientation information may be shared or exchanged on an ongoing basis to maintain knowledge of each elements' relative position and/or orientation during an entire AR or VR experience.

In still other embodiments, the one or more sensors 220 of air flow generator 214 and the one or more sensors 206 of HMD 200 may receive and/or generate electronic signals representative of the motion/position of air flow generator 214 and HMD 200. These electronic signals may be received and processed by circuitry of processing component 202 to determine the motion of a user of HMD 200 and an absolute orientation of HMD 200 in the north-east-south-west (NESW) and up-down planes. Controller 218 of air flow generator 214 may also determine the motion of the user's hand(s) that are used to move or actuate the AR or VR controller on which air flow generator 214 is located. In various embodiments, these one or more sensors 206 and 220 may comprise one or more gyroscopes, accelerometers, and magnetometers. Processing component 202 of HMD 200 and controller 218 of air flow generator 214 may exchange this information so their relative position and/or orientation may be determined. Communication between HMD 200 and air flow generator 214 may allow for synchronization between the desired air flow effects and the AR or VR content presented to the user of HMD 200.

It should be noted that in some embodiments, one or more air flow generators may be implemented on the HMD itself. In this case, the location of the one or more air flow generators relative to the HMD or portion(s) of the HMD on which they are located may be considered to be static. Accordingly, it may be sufficient to generate the desired air flow effect (e.g., direction and angle), solely based on position and/or orientation of the HMD.

Returning to FIG. 1, the air flow generator is actuated to aim the air flow generator in accordance with the desired air flow effect parameters and relative position to the HMD at operation 106. At operation 108, the desired air flow effect on the user of the HMD is generated. As noted above, the relative position and/or orientation of the HMD and air flow generator can be used to properly direct air flow to the HMD/user. Referring to FIG. 2A, controller 218 can actuate the air generation components of air flow generator 214 (i.e., fan assembly 222 and air pointer 224) based on the desired air flow effect parameters, and the positioning and/or orientation information received from the one or more sensors 220 or 206 and/or positioning components 208 or 228.

For example, depending on the amount/intensity of the desired air flow effect, controller 218 may actuate or otherwise control fan assembly 222 to spin at a desired rate, e.g., RPM, to collect and project air. It should be understood that fan assembly 222 may include one or more motors and/or other circuitry known to those of ordinary skill in the art for rotating the fan blades or fan assembly 222. An air intake (discussed below) may also be actuated, e.g., opened or closed a desired amount. Moreover, controller 218 may actuate air pointer 224 to direct air flow output from fan assembly 222 through one or more output slots of air outlet 226 (discussed below). In some embodiments, air pointer 224 may rotate, its rotation being controlled by one or more electromechanical actuators (not shown).

It should be noted that other methods of air flow generation may be used in accordance with other embodiments. For example, miniature or appropriately-sized air compressors or diaphragm pumps may be used instead of the fan-based air flow generator described herein. In some embodiments, a combination of different types of air flow generators may be used to achieve one or more desired air flow effects. In some embodiments, controller 218 may control fan assembly 222 to reverse direction so as to suck in air, rather than expel air to simulate air being sucked out/away.

It should be noted that air flow generator 214 may include an alternative effect component(s) 230. As noted previously, other stimuli or sensory effects may be provided, such as scents/odors, rain/mist, etc. In accordance with some embodiments, alternative effect component(s) 230 may comprise a vial or other dispensing element containing water, perfumed liquid, etc. Depending on the desired air flow effect set forth in the AR/VR software and/or independently activated, controller 218 may instruct alternative effect component(s) 230 to dispense some amount of the liquid, scent, etc. into fan assembly 222. In this way, smells, mist, etc. may be used to produce an enhanced air effect output from air outlet 226. In some embodiments, controller 218 may simply open a valve or vent from alternative effect component(s) 230 to fan assembly 222 to allow, e.g., a scent to permeate the air being output. One or more desired air flow effect parameters may be configured to control the amount of liquid or scent that is dispensed or allowed to escape or vent into the air flow. In some embodiments, alternative effect component(s) 230 may simply be a vial or other receptacle that is opened and need not be directed to fan assembly 222. In still other embodiments, alternative effect component(s) 230 may be a temperature conditioning element, such as a heating coil or additional fan, that can be used to heat/cool the air prior to exiting air outlet 226, prior to entering fan assembly 222, etc.

FIG. 2B is an exploded view of the air flow generation elements of an example air flow generator 214 in accordance with one embodiment. As illustrated in FIG. 2B and briefly described above, air flow generator 214 may include a fan assembly 222, an air pointer 224, and an air outlet 226. Fan assembly 222 may include a base 222A with a side wall 222B. A fan 222D having a plurality of fan blades may spin within base 222A and side wall 222B to generate air flow. Fan assembly 222 may further include an air intake 222C that can direct air to the blades of fan 222D. In some embodiments, air intake 222C may comprise an actuatable opening or inlet to wall 222B (not shown) in order to control the amount of air, scent, liquid, etc. being brought into fan assembly 222. In some embodiments the amount of air intake and/or the amount of air flow output may depend on distance of the air flow generator 214 from the user/HMD 200. In some embodiments base 222A may be used to fixedly or removably attach air flow generator 214 to an HMD, an AR or VR controller, or other mounting element connected to the HMD or AR/VR controller. For example, on the underside of base 222A (not shown), one more connection mechanisms known to those of ordinary skill in the art may be used, e.g., screw attachment, adhesive strip (s), hook and loop, ratcheting engagement means, etc.

Above fan assembly 222 is air pointer 224. Air pointer 224 may be used to concentrate the air flow generated by fan assembly 222 to an output vent or opening 224B. The remaining portion 224A of air pointer 224 may be flat or otherwise shaped/configured so as to block air from escaping or flow anywhere other than output vent/opening 224B. In some embodiments, the entirety of air point 224 may be rotatable about a central axis. In some embodiments, only output vent/opening 224B may be rotatable about air pointer 224, where the remaining portion 224A acts as a base on or over which output vent/opening 224B rotates. By rotating output vent/opening 224B to different positions, air flow generated by fan assembly 222 can be directed as desired. As noted above, desired air effect parameters may be used to control actuation of air flow generator 214. For example, depending on the position of HMD 200 relative to air flow generator 214 or an AR or VR controller on which it is implemented, controller 218 may compute the amount of rotation in degrees needed to direct air flow in a particular direction. It should be noted that air pointer 224 may additionally include a tilt mechanism (not shown) in order to direct air flow up/down relative to the plane of air pointer 224.

Above air pointer 224, an air outlet 226, which may be a static/non-moving air outlet, may comprise a housing or structure 226A in which a plurality of vents 226B are configured. In this way, air pointer 224 may rotate to a certain position and air flow is output from the output vent/opening 224B and out through one or more vents 226B proximate to output vent/opening 224B. In some embodiments, air outlet 226 acts as a protective element. In some embodiments, air outlet 226 may not be needed.

Figure 3:
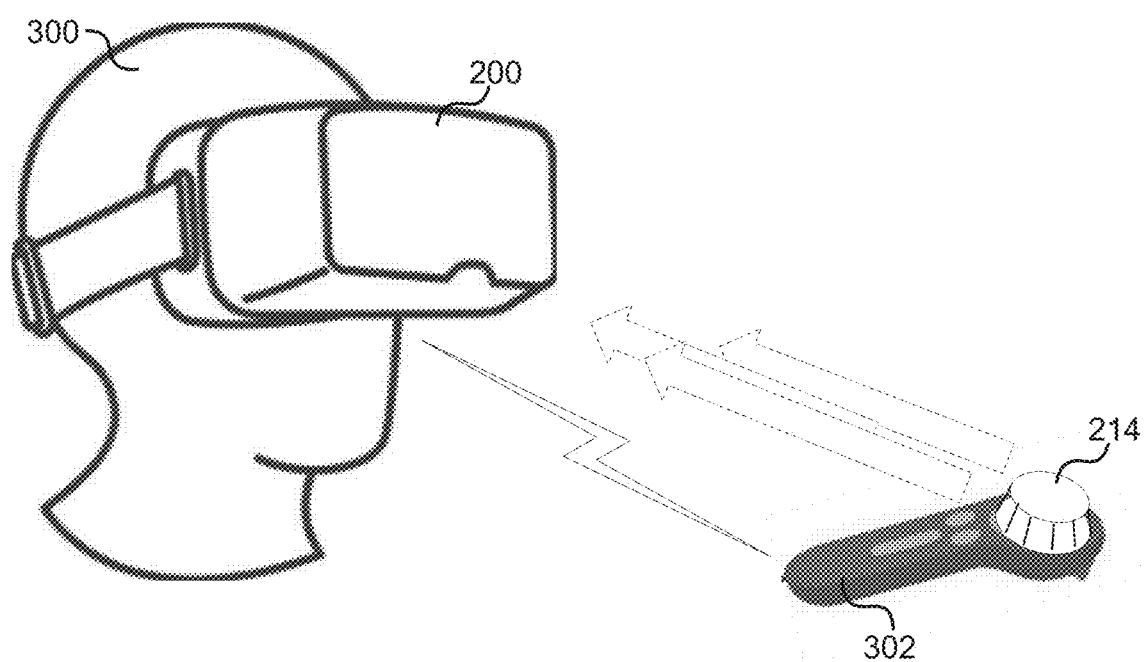
FIG. 3 illustrates an example configuration of an air flow generator that may be used in one embodiment of the present disclosure.

FIG. 3 is a diagram illustrating an example directed air flow scenario and configuration in accordance with one embodiment of the present disclosure. As illustrated in FIG. 3, a user 300 may be wearing an HMD 200. User 300 may be engaged in an AR or VR experience presented through HMD 200. User 300 may interact with the AR or VR environment presented in the AR or VR experience using an AR or VR controller 302. AR or VR controller 302 may be any handheld or other input control device known to those of ordinary skill in the art. AR or VR controller 302 may communicate with HMD 200 to effectuate the aforementioned control/interaction. In some embodiments, AR or VR controller 302 may communicate wirelessly with HMD 200, but in some embodiments, AR or VR controller 302 may be operatively connected to HMD 200 over a wired connection.

In this embodiment, an air flow generator 214 is implemented atop AR or VR controller 302 and configured to provide desired air flow effects to user 300 as described above, e.g., by determining relative positioning and/or orientation of HMD 200 to air flow generator 214.

Figure 4:
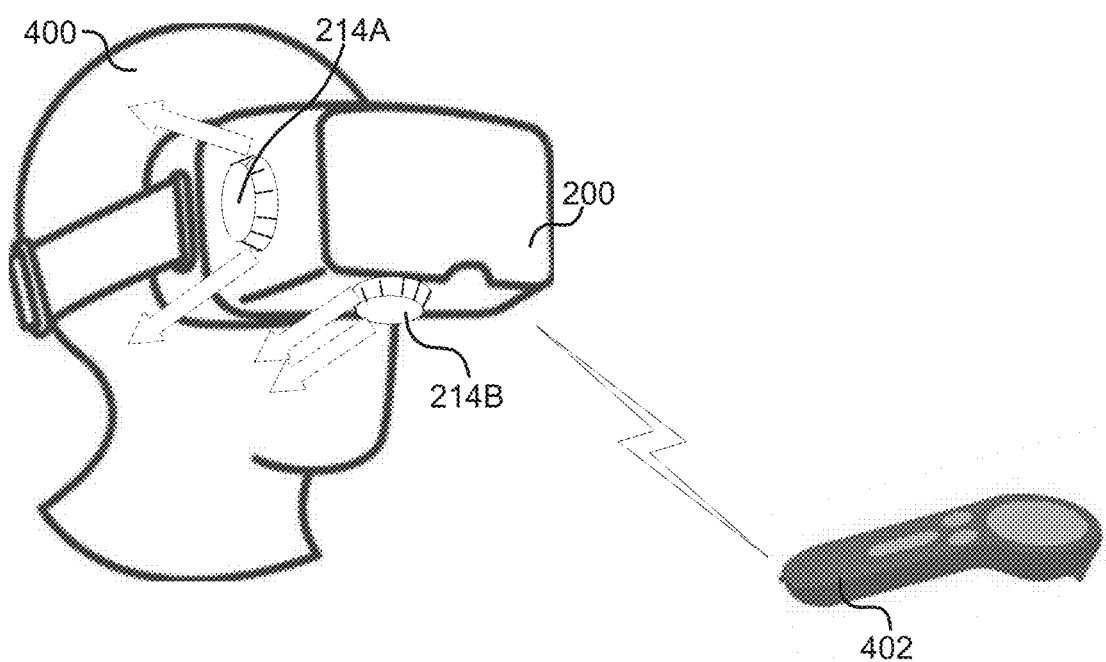
FIG. 4 illustrates an example configuration of air flow generators that may be used in one embodiment of the present disclosure.

FIG. 4 is a diagram illustrating an example directed air flow scenario and configuration in accordance with another embodiment of the present disclosure. As illustrated in FIG. 4, a user 400 may be wearing an HMD 200. User 400 may be engaged in an AR or VR experience presented through HMD 200. User 400 may interact with the AR or VR environment presented in the AR or VR experience using an AR or VR controller 402. AR or VR controller 402 may be any handheld or other input control device known to those of ordinary skill in the art. AR or VR controller 402 may communicate with HMD 200 to effectuate the aforementioned control/interaction. In some embodiments, AR or VR controller 402 may communicate wirelessly with HMD 200, but in some embodiments, AR or VR 402 may be operatively connected to HMD 200 over a wired connection. In this embodiment, a plurality of air flow generators 214A and 214B are implemented on HMD 200. For example, air flow generator 214A may be implemented on a first side of HMD 200, while air flow generator 214B may be implemented on the underside of HMD 200. In this example, relative positioning between AR or VR controller 402 and HMD 200 is unnecessary. In some embodiments, the location of air flow generators 214A and 214B relative to HMD 200 is sufficiently similar that only desired air flow effect parameters characterizing, e.g., the force and direction of air flow is needed. In some embodiments, the position and/or orientation of air flow generators 214A and 214B relative to HMD 200 may still be determined and used in conjunction with the desired air flow effect parameters to generated the desired air flow effect.

Figure 5:
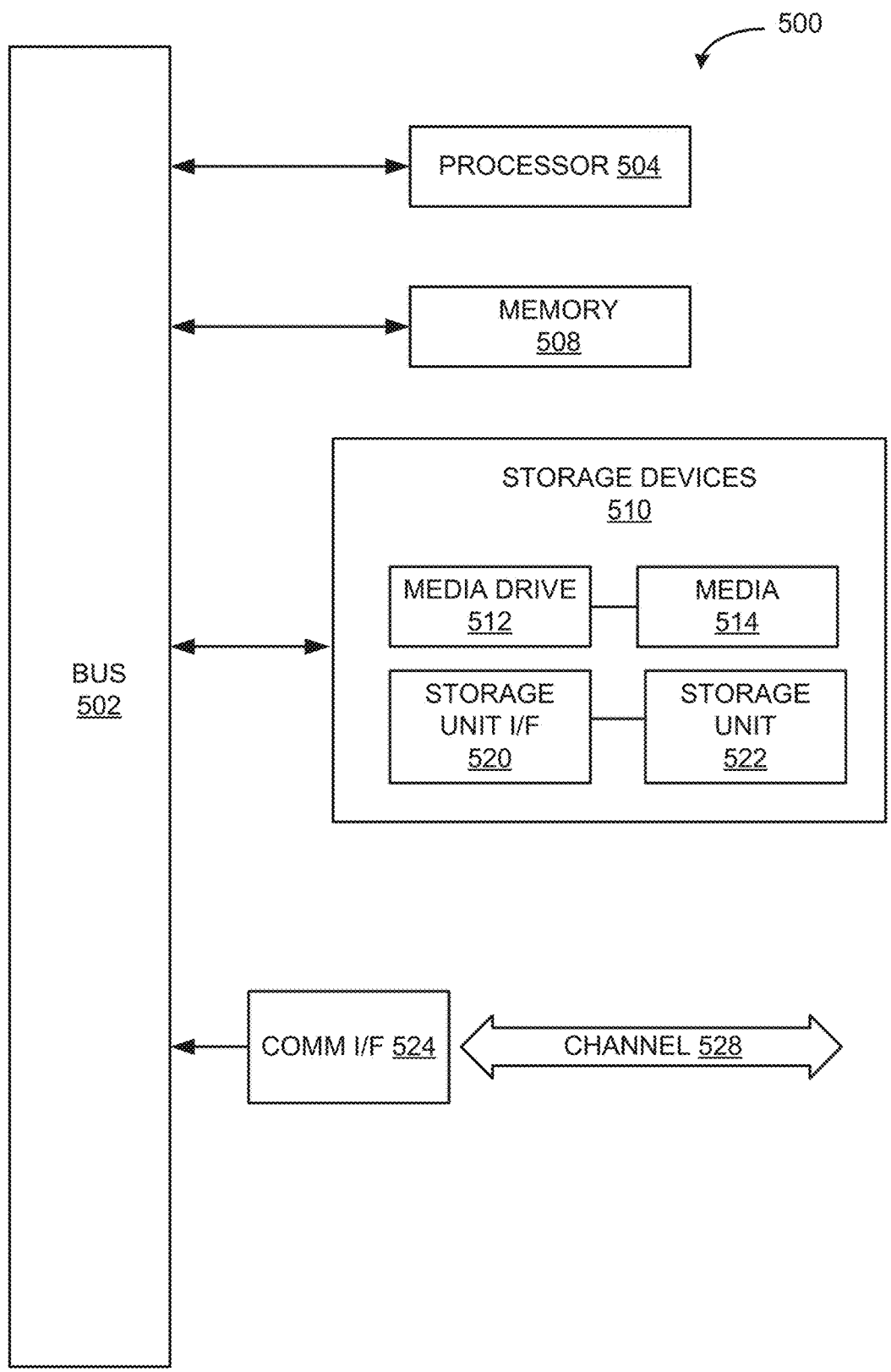
FIG. 5 illustrates an example computing component that may be used to implement various features of the systems and methods disclosed herein.

FIG. 5 illustrates an example computing component that may be used to implement various features of the system and methods disclosed herein, for example, one or more elements of HMD 200 and/or air flow generator 214.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example navigation systems, portable computing devices, and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
providing augmented reality or virtual reality (AR/VR) content to a head-mounted display (HMD);
determining an air flow effect parameter based on the AR/VR content;
receiving a user input from a controller to control an aspect of the AR/VR content, wherein the controller includes an air flow generator;
determining position information based on a position of the HMD;
transmitting the position information to the controller;
directing a portion of the air flow generator based on a relative position of the air flow generator to the HMD based on the position information; and
actuating the air flow generator to generate an air flow effect based on the air flow effect parameter, wherein the air flow effect enhances the AR/VR content.

2. The method of claim 1, wherein determining the air flow effect parameter comprises parsing software code that upon execution displays the AR/VR content.

3. The method of claim 1, wherein determining the air flow effect parameter comprises receiving the air flow effect parameter from the HMD at the controller.

4. The method of claim 1, wherein the air flow effect parameter comprises at least one of an air flow intensity value, a duration during which the air flow effect should be generated, or at least one direction in which the air flow effect should be directed.

5. The method of claim 1, wherein directing the portion of the air flow generator repeats throughout provision of the AR/VR content to the HMD.

6. The method of claim 1, further comprising regulating at least one of an air intake or an air output from the air flow generator in accordance with the air flow effect parameter and the relative position.

7. The method of claim 1, wherein the portion of the air flow generator comprises a tilting element, and wherein actuating the air flow generator comprises controlling the tilting element of the air flow generator to direct the air flow effect.

8. The method of claim 1, wherein the portion of the air flow generator comprises a rotating element, and wherein actuating the air flow generator comprises controlling the rotating element of the air flow generator to direct the air flow effect.

9. The method of claim 1, further comprising enhancing the air flow effect with at least one of a scented additive or a liquid additive.

10. The method of claim 1, wherein directing the portion of the air flow generator is based on an orientation of the controller.

11. A system, comprising:
a head-mounted display (HMD) configured to display an augmented reality or virtual reality (AR/VR) experience;
a controller configured to control an aspect of the AR/VR experience, wherein the controller includes an air flow generator; and
a non-transitory computer-readable medium having instructions stored thereon that, when executed by a processor cause the system to:
provide the AR/VR experience to the HMD;
determine an air flow effect parameter configured to enhance the AR/VR experience, wherein the air flow effect parameter is based on the AR/VR experience;
determine position information based on a position of the HMD;
transmit the position information to the controller;
direct a portion of the air flow generator based on a relative position of the air flow generator to the HMD based on the position information; and
actuate the air flow generator to generate an air flow effect based on the air flow effect parameter.

12. The system of claim 11, wherein the controller is communicatively connected to the HMD.

13. The system of claim 11, wherein the processor comprises a processing component of one of the controller or the HMD.

14. The system of claim 11, wherein the controller is configured to move relative to the HMD in accordance with one or more user actions.

15. The system of claim 11, further comprising one or more sensors and one or more markers associated with at least one of the HMD, the air flow generator, or the controller, the one or more sensors tracking the one or more markers to facilitate determination of the relative position of the air flow generator to the HMD.

16. The system of claim 11, wherein the air flow effect parameter comprises at least one of an air flow intensity value, a duration during which the air flow effect should be generated, or at least one direction in which the air flow effect should be directed relative to the HMD.

17. The system of claim 11, wherein the air flow generator comprises a fan assembly, an air pointer from which the air flow effect is output, and a static air outlet.

18. The system of claim 17, wherein the instructions comprise further instructions to control at least one of an air taken in by the fan assembly or a speed at which the fan assembly operates to control an intensity of the air flow effect.

19. The system of claim 17, wherein the instructions comprise further instructions to actuate the air pointer in one or more directions to control a direction in which the air flow effect is output from the air pointer.

20. The system of claim 11, wherein the instructions cause the system to:
update the relative position of the air flow generator to the HMD to an updated relative position, wherein the updated relative position is based on the position information transmitted between the HMD and the air flow generator, and wherein the updated relative position of the air flow generator maintains a direction of the air flow effect between the air flow generator and the HMD.

* * * * *